United States Patent
Liu et al.

(10) Patent No.: US 12,143,509 B2
(45) Date of Patent: Nov. 12, 2024

(54) EMBEDDING INTERMEDIATE CERTIFICATE IN DIGITAL CERTIFICATE

(71) Applicant: MICROSOFT TECHNOLOGY LICENSING, LLC, Redmond, WA (US)

(72) Inventors: Pu Liu, Carnation, WA (US); Yingchang Charley Zhang, Redmond, WA (US); Akshay Kishor Kulkarni, Redmond, WA (US); Deyang Gu, Mercer Island, WA (US); Lucius B. Fleuchaus, Redmond, WA (US); Phililp Joseph Hallin, Port Townsend, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 340 days.

(21) Appl. No.: 17/585,132

(22) Filed: Jan. 26, 2022

(65) Prior Publication Data
US 2023/0239164 A1   Jul. 27, 2023

(51) Int. Cl.
*H04L 9/00*   (2022.01)
*H04L 9/32*   (2006.01)

(52) U.S. Cl.
CPC .......... *H04L 9/3268* (2013.01); *H04L 9/3236* (2013.01); *H04L 9/3247* (2013.01); *H04L 9/3265* (2013.01)

(58) Field of Classification Search
CPC ... H04L 9/3268; H04L 9/3236; H04L 9/3247; H04L 9/3265
See application file for complete search history.

(56) References Cited

U.S. PATENT DOCUMENTS

| | | | |
|---|---|---|---|
| 8,219,805 B1* | 7/2012 | Ie | H04L 9/3265 713/156 |
| 11,528,150 B1* | 12/2022 | Stapleton | H04L 9/3242 |
| 2009/0259855 A1* | 10/2009 | de Cesare | G06F 21/51 713/189 |
| 2013/0117560 A1* | 5/2013 | Resch | H04L 63/0823 713/157 |

(Continued)

OTHER PUBLICATIONS

Certification Path Validation Algorithm—https://en.wikipedia.org/wiki/Certification_path_validation_algorithm (Year: 2008).*

(Continued)

*Primary Examiner* — Daniel B Potratz
*Assistant Examiner* — Syed M Ahsan
(74) *Attorney, Agent, or Firm* — Shook, Hardy & Bacon L.L.P

(57) ABSTRACT

Technology is shown for verifying a leaf certificate in a PM chain of trust involving receiving a leaf certificate signed by an intermediate certificate embedded in the leaf certificate. The intermediate certificate is extracted from the received leaf certificate and its public key used to calculate a signature for the received leaf certificate. The calculated signature is compared to a signature included in the received leaf certificate. The received leaf certificate is verified when the calculated signature matches the signature included in the received leaf certificate. The intermediate certificate can be included as a X.509 property of the leaf certificate.

20 Claims, 12 Drawing Sheets

(56) References Cited

U.S. PATENT DOCUMENTS

2018/0091313 A1* 3/2018 Li .......................... G06F 9/4403
2022/0116229 A1* 4/2022 Jones .................... H04L 9/3265

OTHER PUBLICATIONS

Certificate Management for Embedded Systems—https://web.archive.org/web/20211221075557/https://realtimelogic.com/articles/Certificate-Management-for-Embedded-Systems (Year: 2021).*

* cited by examiner

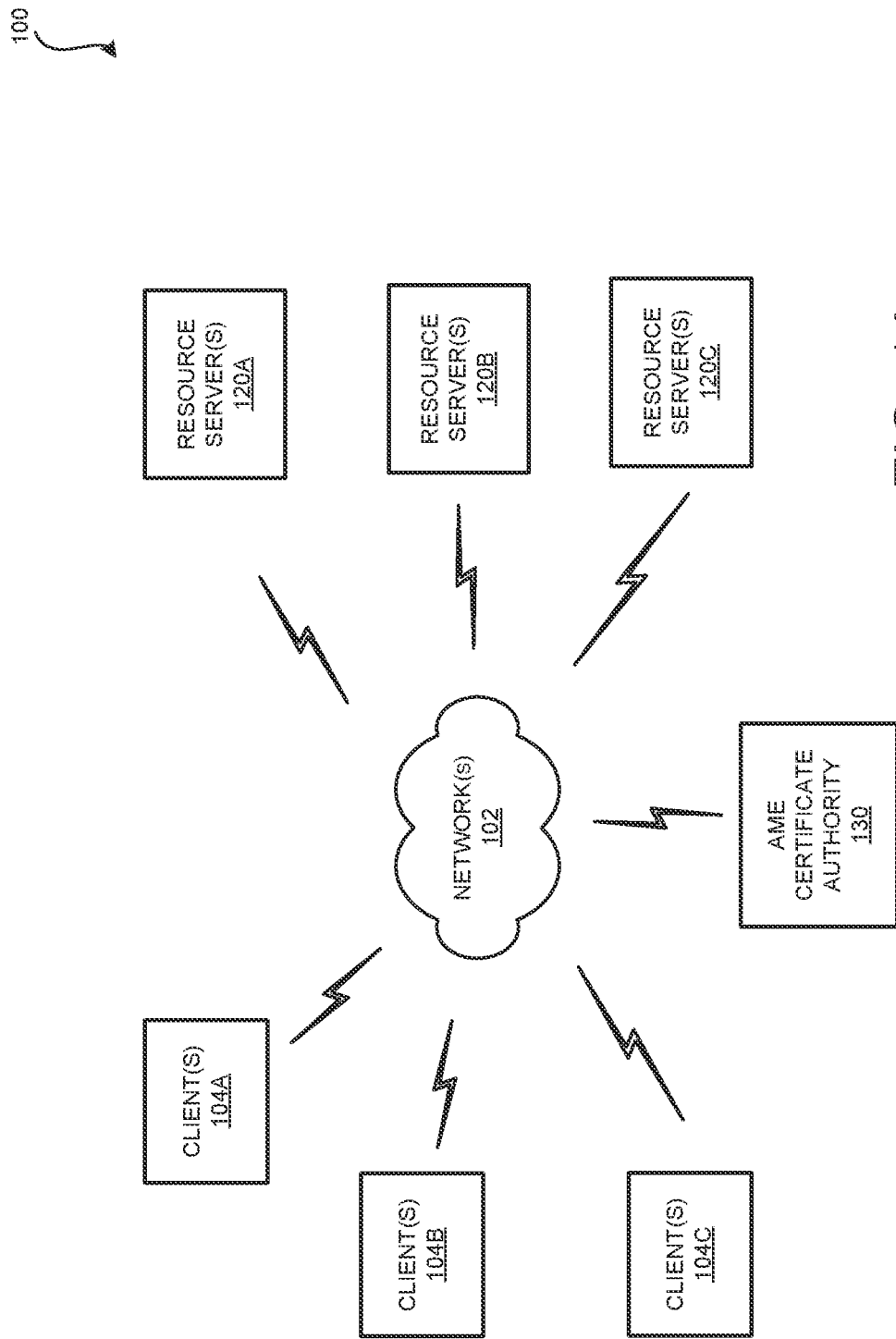

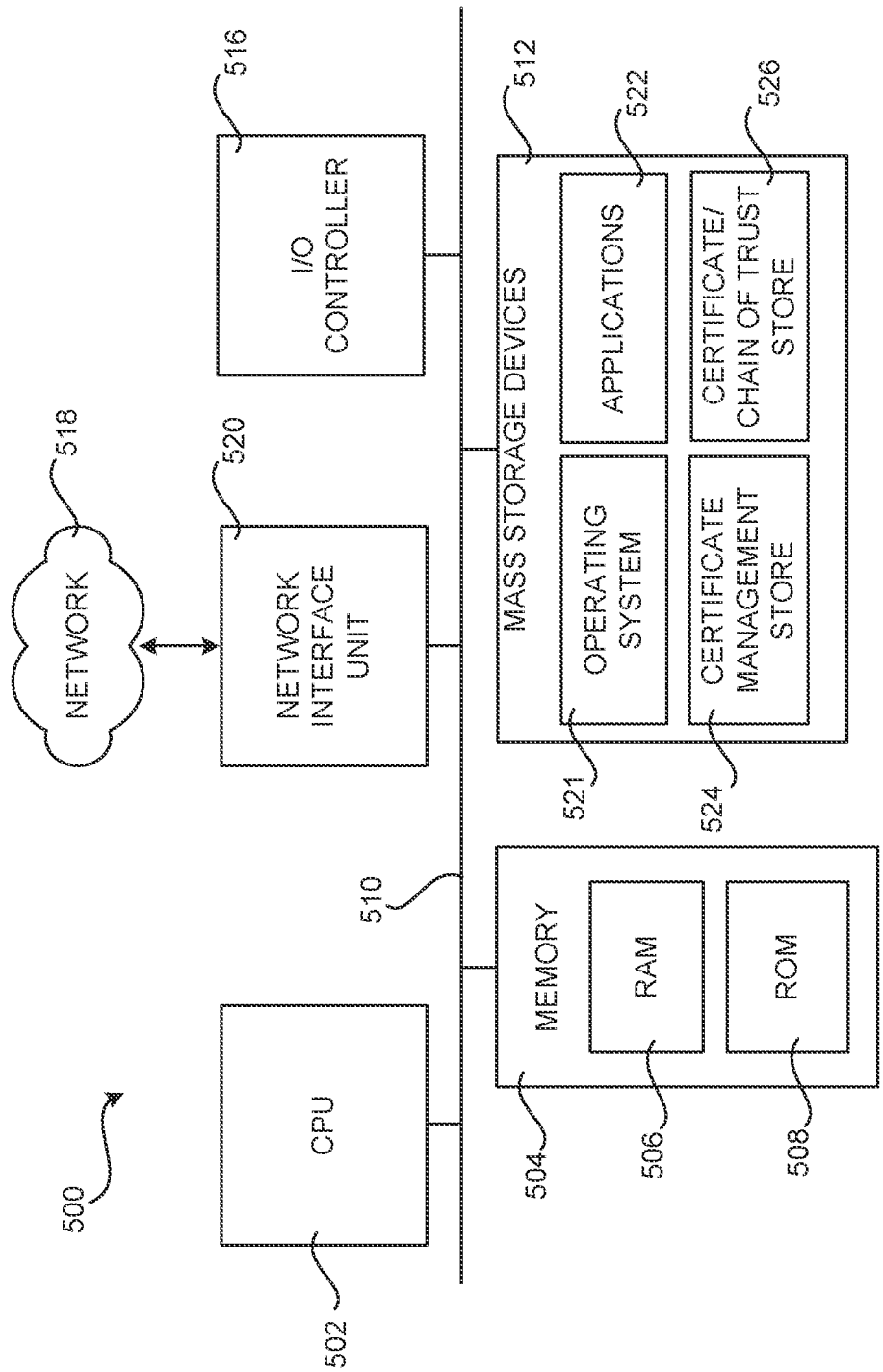

EMBEDDING INTERMEDIATE CERTIFICATE IN DIGITAL CERTIFICATE

BACKGROUND

A frequently utilized approach to secure communications in a network is the use of digital certificates for encryption and decryption of the communications. A digital certificate is a digital document that includes the public key typically bound to an individual, organization, or computer. For example, X.509 digital certificate authentication is a standards-based security framework that is used to secure private information and transaction processing. Digital certificates can also be used to authenticate and authorize sessions between users or clients and servers or resources.

Certificates are issued by certificate authorities (CAs) that normally have documented policies for determining certificate owner identity and distributing certificates. For authentication purposes, certificates make use of a public key and a related private key. The issuing CA binds these keys, along with other information about the certificate owner, to the certificate itself for identification purposes.

The certificates are exchanged in a protocol that makes sure the presenter of a certificate possesses a private-key associated with a public-key contained in a certificate.

It is with respect to these and other technical challenges that the disclosure made herein is presented.

SUMMARY

The disclosed technology is directed to embedding a PM intermediate certificate for a leaf certificate in the leaf certificate itself so that the leaf certificate is verified by the intermediate certificate used to generate the leaf certificate when establishing a secure communications session using the leaf certificate.

A problem that can arise for certificates is that the certificates are often distributed throughout a massively distributed system. When a certificate changes, e.g. key rotation, the changes can propagate to different nodes of the distributed system at different speeds, which can result in different nodes being out of synchronization, i.e. having different versions of a certificate. An advantage of the disclosed technology is that the use of an intermediate certificate embedded in an identity certificate to verify the identity certificate avoids a verification handshake failure when two nodes are out of synchronization with one another with respect to versions of an intermediate certificate in the intermediate certificate.

In general terms, an advantage of embedding an intermediate certificate in a certificate in accordance with the disclosed technology is that the intermediate certificate for a leaf certificate flows with the certificate from an entity that owns the leaf certificate all the way to a remote site or service. Other technical effects other than those mentioned herein can also be realized from implementation of the technologies disclosed herein.

Methods, systems and computer-readable in accordance with aspects of the disclosed technology for verifying a leaf certificate in a PM chain of trust involve receiving a leaf certificate signed by an intermediate certificate, where the intermediate certificate is embedded in the leaf certificate. The intermediate certificate is extracted from the received leaf certificate and its public key used to calculate a signature for the received leaf certificate. The signature calculated for the received leaf certificate is compared to a signature included in the received leaf certificate and the received leaf certificate is verified when the calculated signature for the received leaf certificate matches the signature included in the received leaf certificate.

In particular examples, the leaf certificate is verified when a signature for each remaining certificate in a chain of trust for the received leaf certificate is calculated, the calculated signature for each remaining certificate in the chain of trust for the received leaf certificate is compared to a signature included in each remaining certificate in the chain of trust, and the received leaf certificate is verified when the calculated signature for each remaining certificate in the chain of trust for the received leaf certificate matches the signature included in each remaining certificate in the chain of trust.

Certain examples also involve receiving a certificate signing request for an identity, generating the leaf certificate for the identity in response to the certificate signing request, embedding an intermediate certificate in the leaf certificate, signing the leaf certificate using the intermediate certificate, and distributing the leaf certificate with the embedded intermediate certificate.

In specific examples, the intermediate certificate is included in the leaf certificate as an X.509 property of the leaf certificate. In some examples, the intermediate certificate corresponds to an intermediate certificate authority. And in some examples, the leaf certificate is received and verified as part of a TLS handshake protocol.

Some particular examples involve calculating a first hash value for the leaf certificate before distributing the leaf certificate, including the first hash value in the leaf certificate to be distributed, and signing the leaf certificate using an intermediate certificate involves signing the leaf certificate with the first hash value using an intermediate certificate. These examples also involve calculating a second hash value for the received leaf certificate, comparing the second hash value to the first hash value included in the received leaf certificate, and verifying the received leaf certificate when the calculated signature for the leaf certificate matches the signature included in the leaf certificate and the first hash value matches the second hash value.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1A is a network architecture diagram illustrating a background for the disclosed technology;

FIG. 5 is a computer architecture diagram showing an illustrative computer hardware and software architecture for a computing device, such as the computing devices shown in FIG. 3, that can implement aspects of the technologies presented herein;

DETAILED DESCRIPTION

Figure 1B:
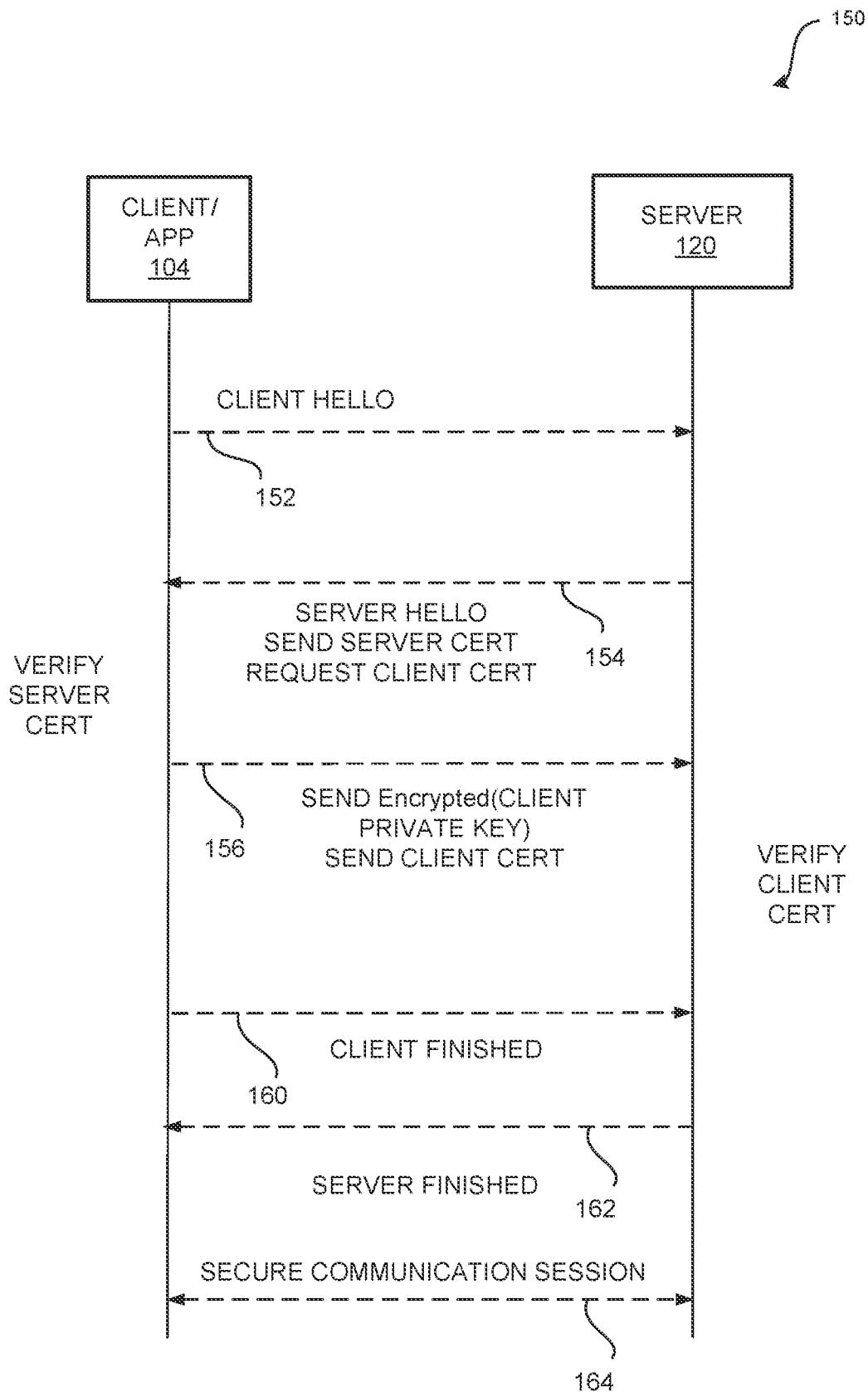
FIG. 1B is a messaging diagram showing an illustration of a conventional handshake message sequence involving a certificate exchange in the environment shown in FIG. 1A.

The following detailed description is directed to technology for verifying a leaf certificate in a PM chain of trust involving embedding an intermediate certificate used to sign a leaf certificate in the leaf certificate. When a leaf certificate is generated by a certificate authority, an intermediate certificate corresponding to the certificate authority is used to sign the leaf certificate and the intermediate certificate embedded in the leaf certificate. The leaf certificate with the embedded intermediate certificate can then be distributed.

When verifying a received leaf certificate, e.g. in a TLS handshake protocol, the intermediate certificate can be extracted from the received leaf certificate and its public key used to calculate a signature for the received leaf certificate. The calculated signature can be compared to a signature included in the received leaf certificate. The received leaf certificate is verified when the calculated signature matches the signature included in the received leaf certificate.

One approach to securing communications between entities in a network is the use of public key infrastructure (PM) to create, manage, distribute, use, store and revoke digital certificates and manage public-key encryption for secure network communications. PM facilitates the secure electronic transfer of information for a range of network activities, such as e-commerce, internet banking and confidential email, where simple password protection is generally an inadequate authentication method and more rigorous proof is required to confirm the identity of the parties involved in the communication and to validate the information being transferred.

Digital certificates can allow entities to establish secure communication between the entities using the public keys included in each certificate to encrypt data. Data encrypted using the public key from an entity's digital certificate can be decrypted by the entity using its locally stored private key.

The integrity of a digital certificate in PM generally involves a chain of trust that links a digital certificate, e.g. a leaf certificate associated with an entity, to a root certificate often through a series of intermediate certificates. A leaf certificate typically is signed using a private key of an intermediate certificate to which it is linked such that the leaf certificate can be verified using a public key of the intermediate certificate. The chain may include multiple intermediate certificates. Each certificate in the chain is signed by a preceding certificate, if any, reaching back to a root certificate. Typically, the root certificate is associated with a major system provider and is publicly known.

The intermediate certificates in PM systems are usually separately distributed to client and server machines via agents. Client and server machines that validate a certificate chain of trust as part of a TLS handshake generally depend on the intermediate certificates to be distributed in a timely manner, not accidentally deleted or corrupted, and renewed in a timely manner. A failure can occur at each of these points. The probability of each failure case increases as a distributed PM system increases in size. Typically, PM systems are massively distributed and depend on consistency in the certificates throughout the system.

Further, a general assumption typically made in regard to conventional client server authentication is that the intermediate certificates are installed on the server, because the certificates stored on servers can typically be more closely controlled than the clients.

This difference in philosophy may be observed in frameworks that target traditional client server systems. For example, the MICROSOFT WINDOWS COMMUNICATION FRAMEWORK (WCF) may drop an intermediate certificate on the server side, which results in that intermediate certificate being unavailable during a TLS handshake exchange. The handshake protocol generally depends on the certificate being installed in the Windows certificate store on the server. If an intermediate certificate is dropped from the certificate store, then the TLS handshake in a conventional system will likely fail.

In general terms, in the disclosed technology, when a client machine requests the renewal of anew leaf certificate, it contacts a Certificate Authority (CA), by sending it a Certificate Signing Request (CSR). The CSR contains the public key to be signed by the CA. The CA signs the new public key with its intermediate certificate's private key, creates a leaf certificate and embeds the public key of its intermediate certificate into the leaf certificate, e.g. in a X.509 certificate section, and returns the leaf certificate to the client.

During a next TLS handshake, the client exchanges its public certificate with a server side. The server side extracts the intermediate certificate from the client leaf certificate, builds the certification chain of trust and validates the certification chain of trust.

An advantage of the disclosed technology can be that both sides of a TLS handshake protocol can be treated equally and symmetrically, like in a peer to peer PM network, which can avoid a handshake failure from occurring when an intermediate certificate is not present in a local certificate store.

Another advantage of the disclosed technology can be that the trusted root certificate for a chain of trust may be the only certificate that needs to be distributed in order to verify a chain of trust. Trusted root certificates typically have a very long life span, often measure in terms of years. Thus, distributing the trusted root certificate is infrequent and maintaining a current state for a trusted root certificate can be relatively easy and reliable compared to maintaining the state of intermediate certificates that change more frequently.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable customer electronics, computing or processing systems embedded in devices (such as wearables, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of a machine learning system that provides reduced network bandwidth transmission of content will be described.

FIG. 1A is a network architecture diagram showing an illustrative computing environment 100 illustrating a background for the disclosed technology. The example shown includes client devices 104, resource servers 120 and Certificate Authority (CA) 130, which can communicate with one another via network 102.

In this example, computing devices 104 can be a client device, such as personal computers, laptop computers, tablet computers, or smart phones. Resource servers 120 can be machines or systems that provide resources or services to client devices 104 or other servers. Communications between client devices 104 and resource servers 120 can be encrypted using digital certificates distributed by CA authority 130.

CA 130 is a trusted entity that manages certificate permissions for a domain, enterprise or other entity using service permissions bound to a digital identity certificate to control access of an identity to services and operations. CA 130 can be one or more servers, or remote computing resources provided by a cloud computing platform. CA 130 is typically controlled by a trusted entity that creates certificate permissions, e.g. claims. The certificate permissions can be established and maintained along with the digital identity certificates.

FIG. 1B is a messaging diagram illustrating an example of a conventional handshake message sequence 150 involving a certificate exchange, such as in a Transport Layer Security (TLS) exchange, in the environment shown in FIG. 1A. Message sequence 150 illustrates the steps for client 104 and server 120 to establish secure communications with one another.

Typically, in sequence 150, client 104 and server 120 agree on a version of the security protocol to use, select cryptographic algorithms for secure communication, and authenticate each other by exchanging and validating digital identity certificates. The client 104 and server 120 can then use asymmetric encryption techniques to generate a shared secret key, which avoids the security problems involved with key distribution. TLS can then use the shared secret key for the symmetric encryption of messages between client 104 and server 120.

At 152, client 104 sends a client hello message that lists cryptographic information such as the TLS version and the cipher suites supported by the client. The message also contains a random byte string that is used in subsequent computations.

At 154, server 120 replies with a server hello message that contains the cipher suite chosen by server 120 from the list provided by client 110, a session ID, and another random byte string. The server 120 also sends its digital certificate. If the server requires a digital certificate for client authentication, the server sends a client certificate request that includes a list of the types of certificates supported and the Distinguished Names of acceptable CAs.

Client 104 verifies the server's digital certificate and sends the random byte string that enables both the client 104 and the server 120 to compute the secret key to be used for encrypting subsequent message data. The random byte string is encrypted with the server's public key from the server's certificate. In response to the client certificate request, the client 104 sends a random byte string encrypted with the client's private key, together with the client's digital certificate.

At 160, client 104 sends server 120 a finished message, that is encrypted with the secret key and signals that the client part of the handshake exchange for the secure communication session is completed. At 162, server 120 sends client 104 a finished message, which is encrypted with the secret key, and signals that the server part of the handshake for the secure communication session is completed. Client 104 and server 120 can exchange messages that are symmetrically encrypted with the shared secret key for the duration of the secure communication session 164 established with the handshake exchange.

Figure 2A:
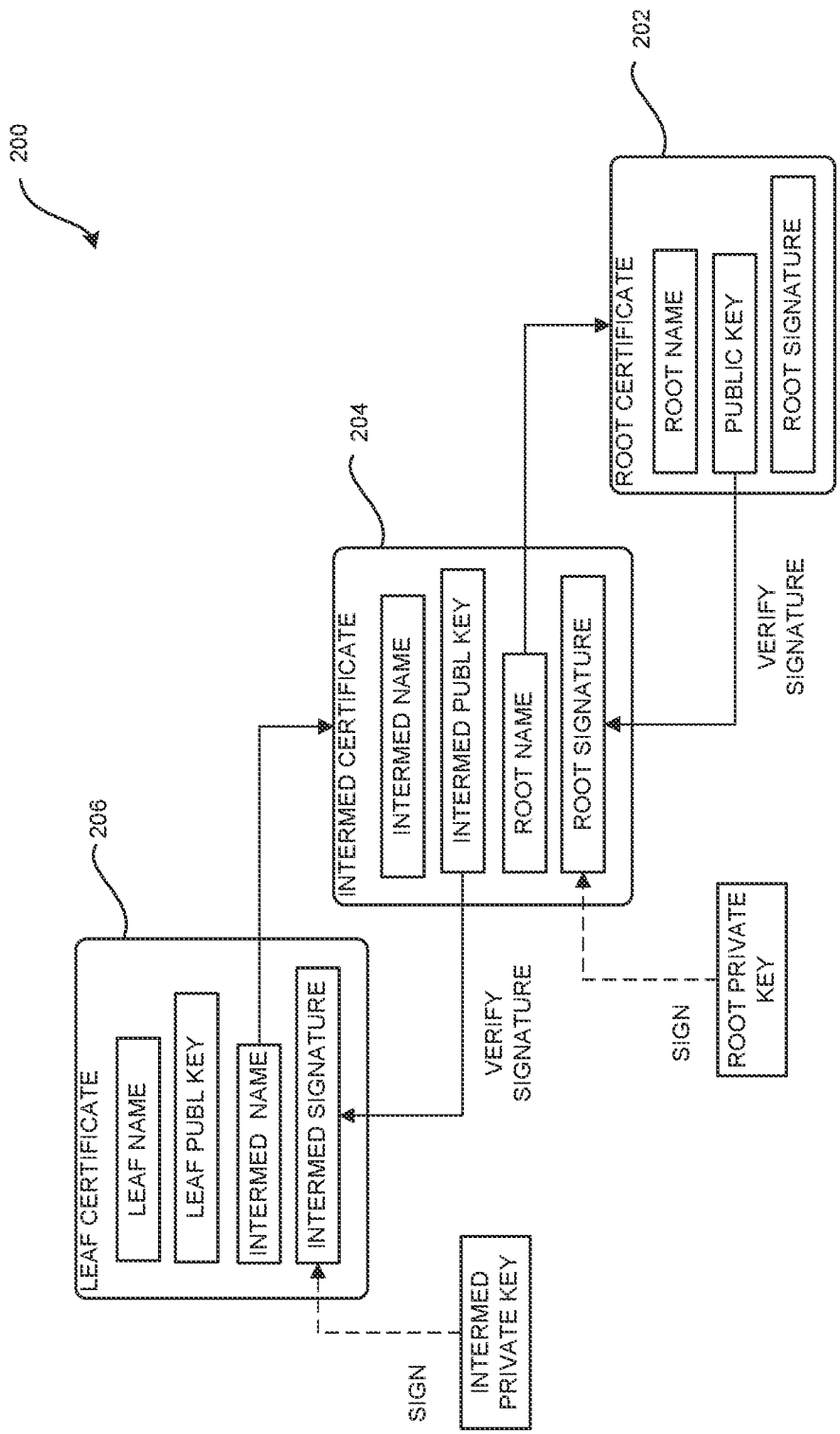
FIG. 2A is a schematic diagram showing an illustration of a chain of trust for a leaf certificate.

FIG. 2A is a schematic diagram showing an illustration of a PM chain of trust 200 for a leaf certificate in a networked environment, such as environment 100 in FIG. 1A. In the example of FIG. 2A, chain of trust 200 includes a leaf certificate 206 associated with an identity that was generated by an intermediate certificate authority associated with intermediate certificate 204. Often, multiple intermediate certificates can be present in a chain of trust. Ultimately, a chain of trust is typically rooted in a root certificate 202, which is a trusted root certificate often associated with a known entity, such as MICROSOFT CORPORATION, AMAZON, INC. or GOOGLE INC.

In chain of trust 200, each certificate is cryptographically signed by the private key of a preceding certificate in the chain to which it is linked by reference. In this example, intermediate certificate 204 is signed by root certificate 202 and leaf certificate 206 is signed by intermediate certificate 204. The signature of each certificate can be verified using the public key of the preceding certificate to ensure the integrity of chain of trust 200.

Figure 2B:
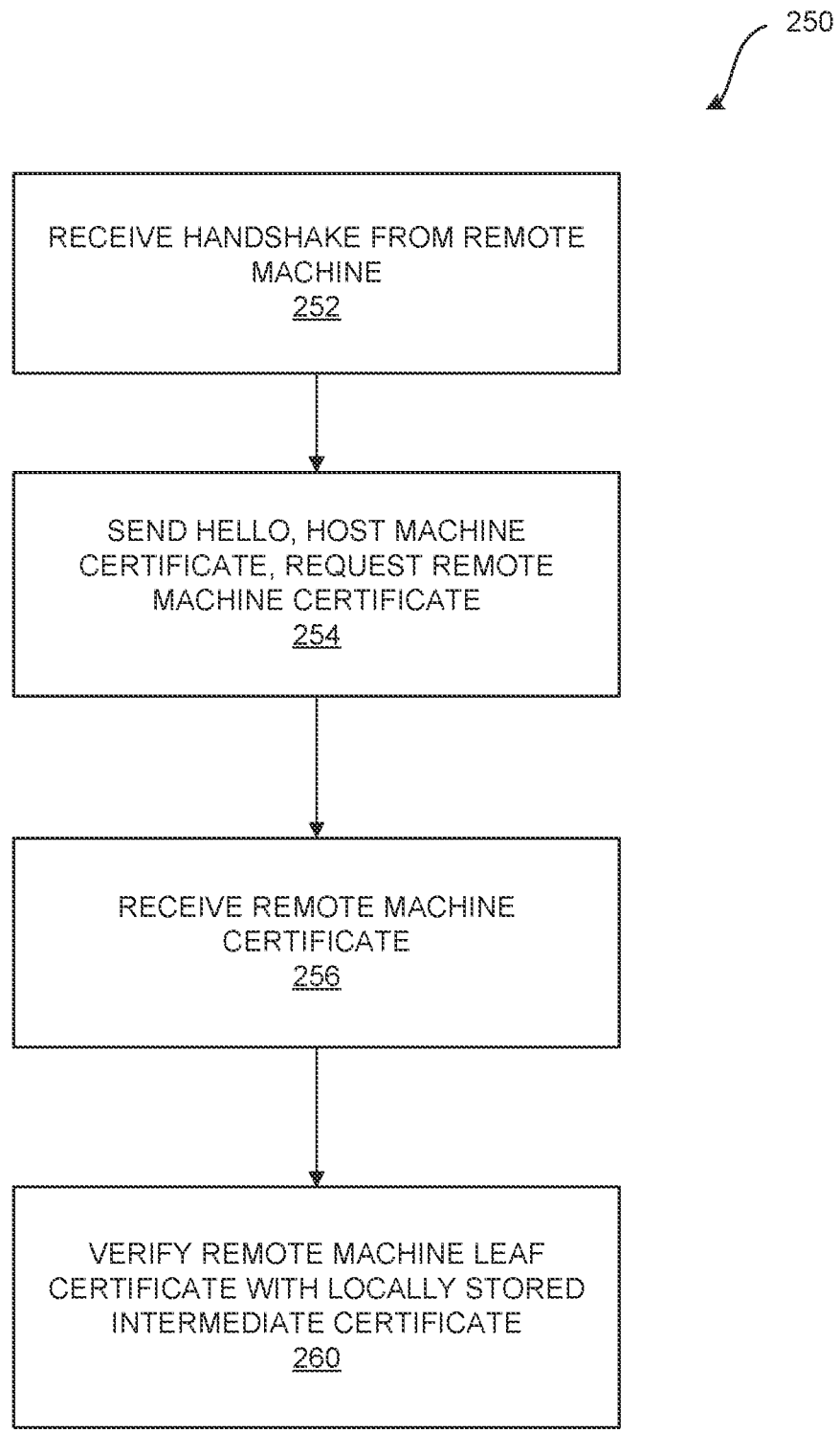
FIG. 2B is a control flow diagram showing an illustration of conventional operations for receiving and verifying a leaf certificate.

FIG. 2B is a control flow diagram showing an illustration of conventional operations 250 in a node for receiving and verifying a leaf certificate, such as in a TLS handshake. At 252, a hello handshake message is received in a host machine, e.g. server 120, from a remote machine, e.g. client 104. At 254, the host machine sends a hello message to the remote machine, sends the host machine's identity certificate, and requests the remote machine's identity certificate. At 256, the host machine receives the remote machine's identity leaf certificate.

At 260, the host machine verifies the remote machine's identity leaf certificate using a locally stored chain of trust that includes the intermediate certificates for the chain of trust. Using the example chain of trust of FIG. 2A, intermediate certificate 204 and root certificate 202 are locally stored on the host machine as a result of a certificate authority having previously distributed the intermediate certificate to the machines in a network, e.g. CA 130 distributing certificates to clients 104 and servers 120 in network architecture 100 in FIG. 1A.

As noted above, a problem for certificates is that the certificates are often distributed throughout a massively distributed system. When a certificate changes, e.g. key rotation, the changes can propagate to different nodes of the distributed system at different speeds, which can result in different nodes being out of synchronization, i.e. having different versions of a certificate.

Figure 2C:
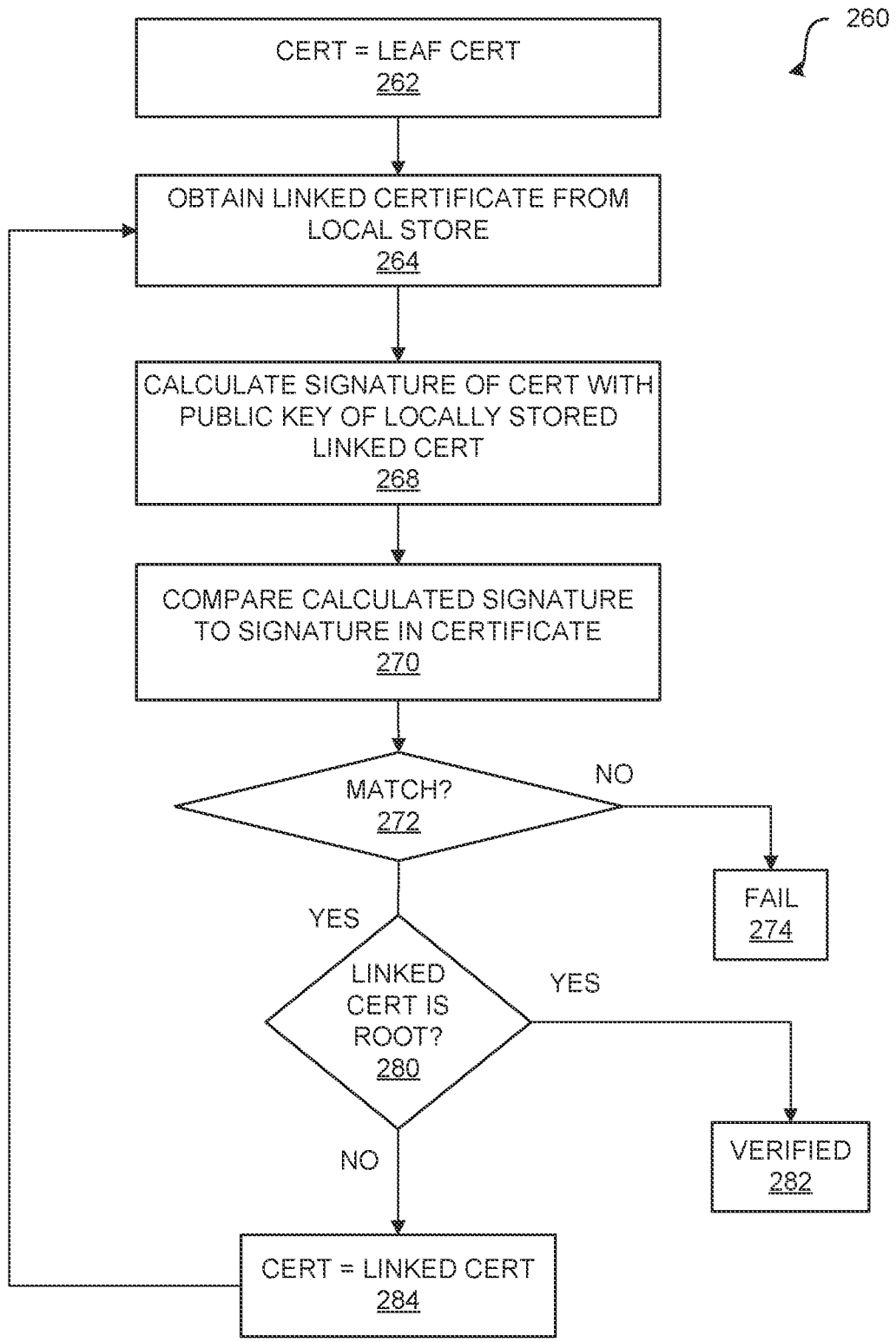
FIG. 2C is a control flow diagram showing an illustration of conventional operations for verifying a chain of trust.

FIG. 2C is a control flow diagram showing an illustration of conventional operations 260 for verifying a chain of trust in a handshake protocol. At 262, verification begins with a leaf certificate. At 264, an intermediate certificate linked to the certificate being verified, i.e. leaf certificate 202 at this point, is obtained from a local store of the verifying machine, e.g. client 104 or server 120.

At 268, a signature of the certificate being verified is calculated using a public key from the locally stored linked certificate, i.e. intermediate certificate 204 at this point. At 270, the calculated signature is compared to the signature on the certificate being verified. If the signatures match, then control branches to 280. If the linked certificate is the root certificate for the chain of trust, then the chain of trust is verified and control branches at 280 to 282.

If the linked certificate is not the root certificate, then control branches at 280 to 284 to set the certificate being verified to the linked certificate, e.g. an intermediate certificate. Control branches to 264 to verify the next certificate in the chain of trust. Process 260 continues until the certificates in the chain of trust are verified back to the root certificate in the chain.

If the calculated signature does not match the signature in the certificate at 270, then verification fails and control branches at 272 to 274. Verification failure can occur if the content of the certificates has been tampered with. However, verification failure can also occur if the locally stored linked certificate, e.g. an intermediate certificate, is out of synchronization with the intermediate certificate used to sign the certificate being verified. This can occur when changes to an intermediate certificate have not propagated to all the nodes of a massive network and two nodes in the network attempt a security handshake, e.g. TLS handshake.

Figure 3:
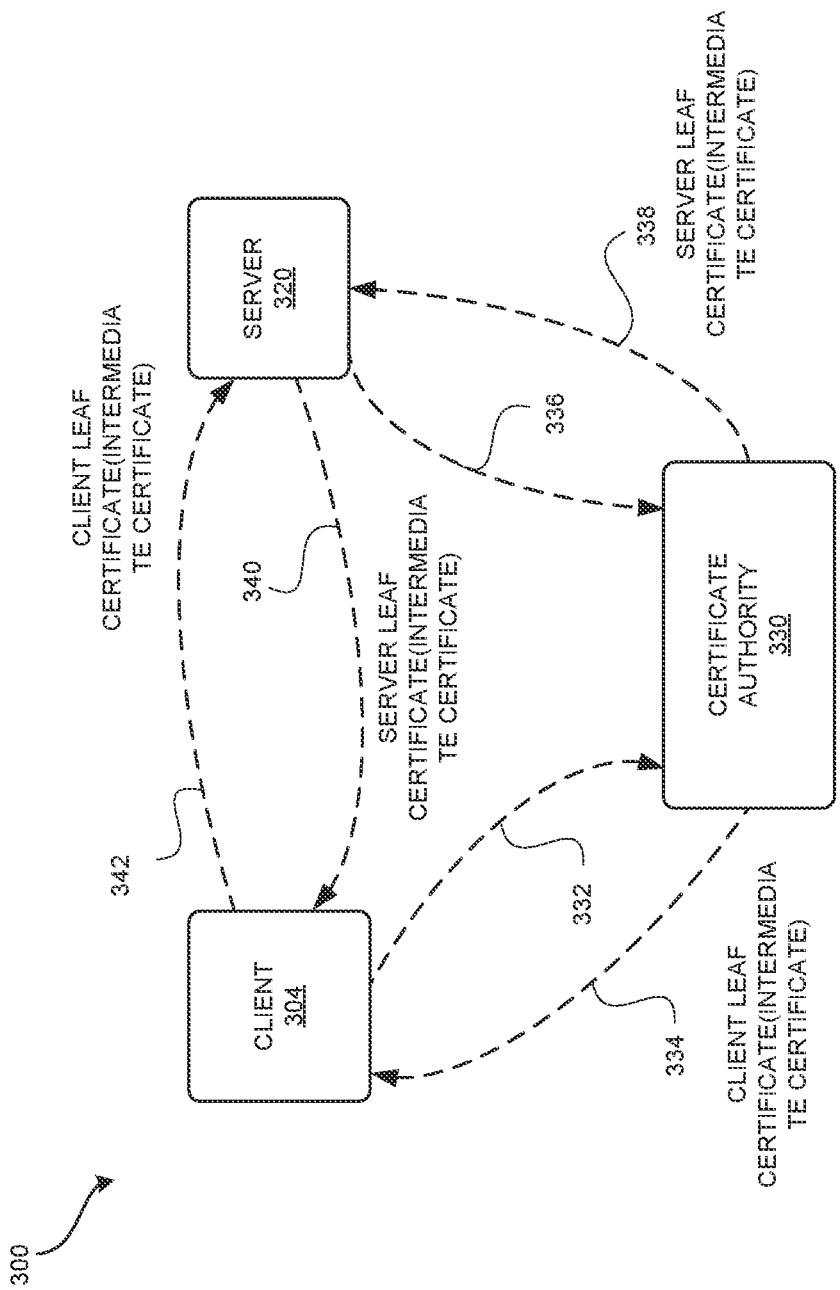
FIG. 3 is a software architecture diagram showing an illustration of distributing certificates with embedded chains of trust according to one aspect of the disclosed technology.

FIG. 3 is a software architecture diagram showing an illustration of messaging in a network environment 300 between nodes for a certificate authority 330 distributing certificates having embedded intermediate certificates or chains of trust according to one aspect of the disclosed technology.

In the example of FIG. 3, at 332, client 304 sends a certificate request to certificate authority 330. CA 330 determines the security properties for the identity associated with request 332, e.g. applies the policies and rules defined for the identity, and generates an appropriate leaf client certificate for the identity and signs it with an intermediate certificate owned by CA 330. In the disclosed technology, CA 330 embeds the intermediate certificate that was used to sign the client certificate within the client certificate itself or embeds an intermediate certificate for the client certificate. At 334, CA 330 sends the client certificate to client 304 in response to the certificate request at 332.

Similarly, at 336, server 320 sends a certificate request to certificate authority 330. CA 330 determines the security properties for the identity associated with request 336 and generates an appropriate identity leaf server certificate for the identity and signs it with the intermediate certificate owned by CA 330. In the disclosed technology, CA 330 embeds the intermediate certificate that was used to sign the server certificate within the server certificate itself or embeds an intermediate certificate for the server certificate. At 338, CA 330 sends the server leaf certificate to server 320 in response to the certificate request at 336.

In a subsequent security protocol handshake, e.g. a TLS handshake, client 304 and server 320 exchange their respective leaf certificates with an embedded intermediate certificate. At 340, server 320 sends its leaf certificate to client 304. At 342, client 304 sends its leaf certificate to server 320.

Figure 4A:
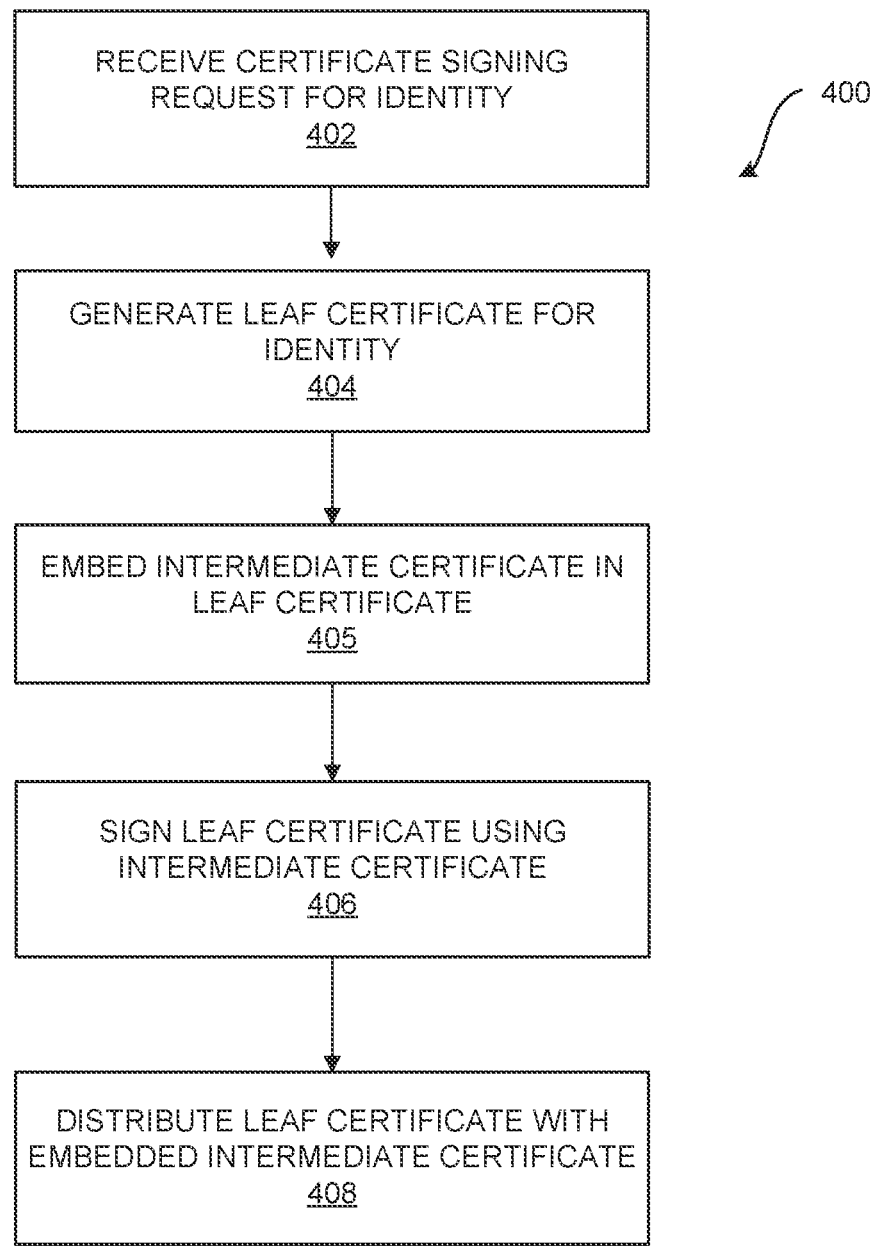
FIG. 4A is a control flow diagram showing a routine that illustrates aspects of operations in a certificate authority for creating and distributing a certificate with an embedded intermediate certificate in accordance with aspects of the disclosed technology.

FIG. 4A is a control flow diagram that illustrates aspects of a process 400 in a certificate authority, such as CA 330 in network environment 300 in FIG. 3, for generating and distributing leaf identity certificates with an embedded intermediate certificate or intermediate certificate in accordance with aspects of the disclosed technology.

At 402, a certificate signing request is received for an identity. At 404, the policies and rules defined for determining certificate owner identity and distribution are applied to generate a leaf certificate for the identity.

At 405, in accordance with aspects of the disclosed technology, the intermediate certificate used to sign the leaf certificate is embedded in the leaf certificate. For example, the intermediate certificate can be added as an X.509 property to the leaf certificate. In some implementations, additional elements of the chain of trust can be embedded in the leaf certificate, such as more than one intermediate certificate from the chain of trust or the complete chain of trust.

At 406, the leaf certificate is signed with an intermediate certificate owned by the certificate authority. At 408, the leaf certificate with the embedded intermediate certificate is distributed to the requesting identity.

Figure 4B:
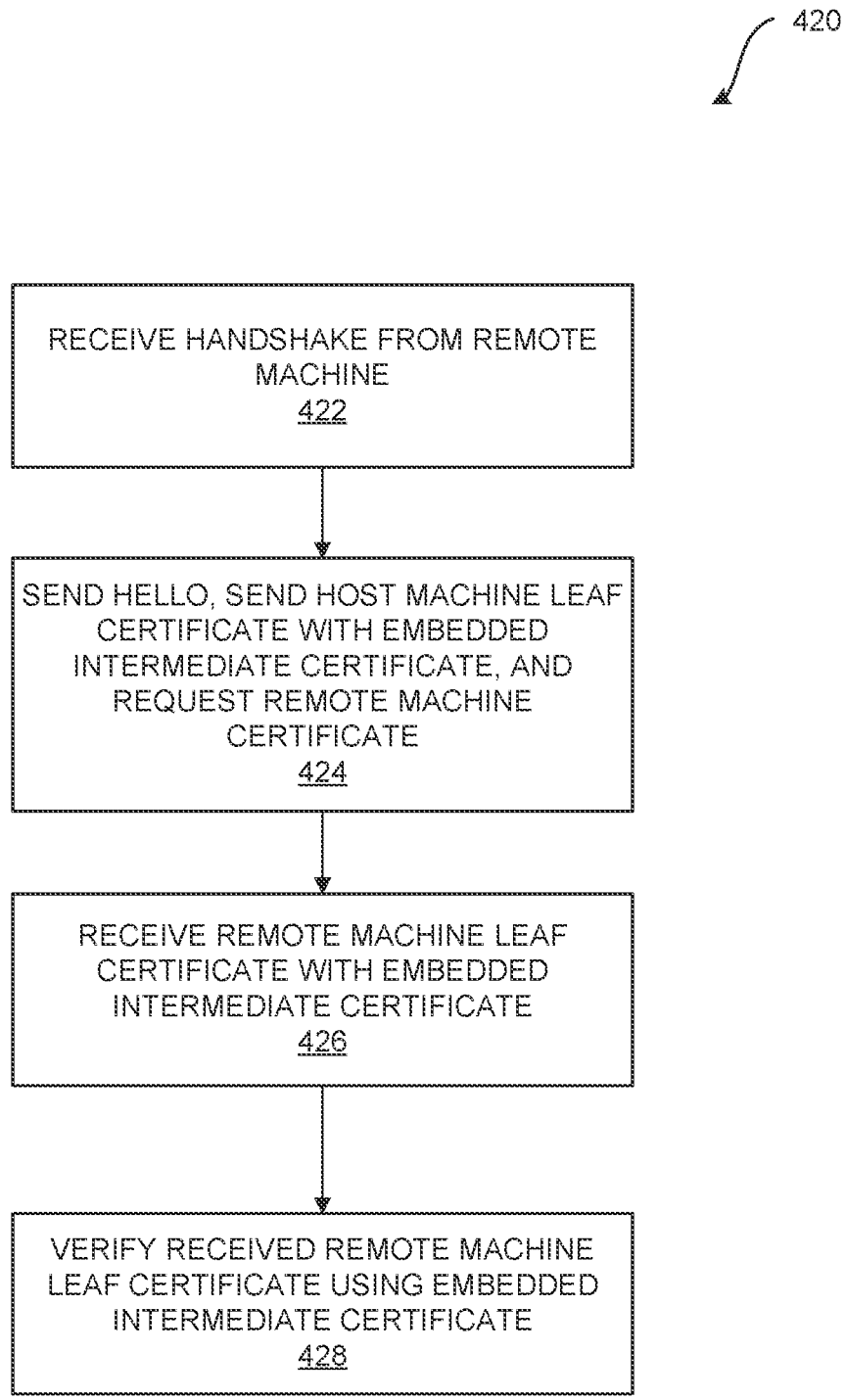
FIG. 4B is a control flow diagram showing a routine that illustrates aspects of operations in a handshake message sequence in the environment shown in FIG. 3 involving a certificate with an embedded intermediate certificate in accordance with aspects of the disclosed technology.

FIG. 4B is a control flow diagram showing a routine 420 that illustrates aspects of operations in a handshake message sequence in the environment shown in FIG. 3 involving a certificate with an embedded intermediate certificate in accordance with aspects of the disclosed technology.

Similar to the handshake sequence of FIG. 2B, at 422, a host machine receives a handshake from a remote machine. At 424, the host machine sends a hello message, sends the host machine certificate with an embedded intermediate certificate, and sends a request for the remote machine certificate.

At 426, the host machine receives a remote machine certificate with an embedded intermediate certificate. At 428, the host machine verifies the received remote machine leaf certificate using the intermediate certificate embedded in the leaf certificate.

Figure 4C:
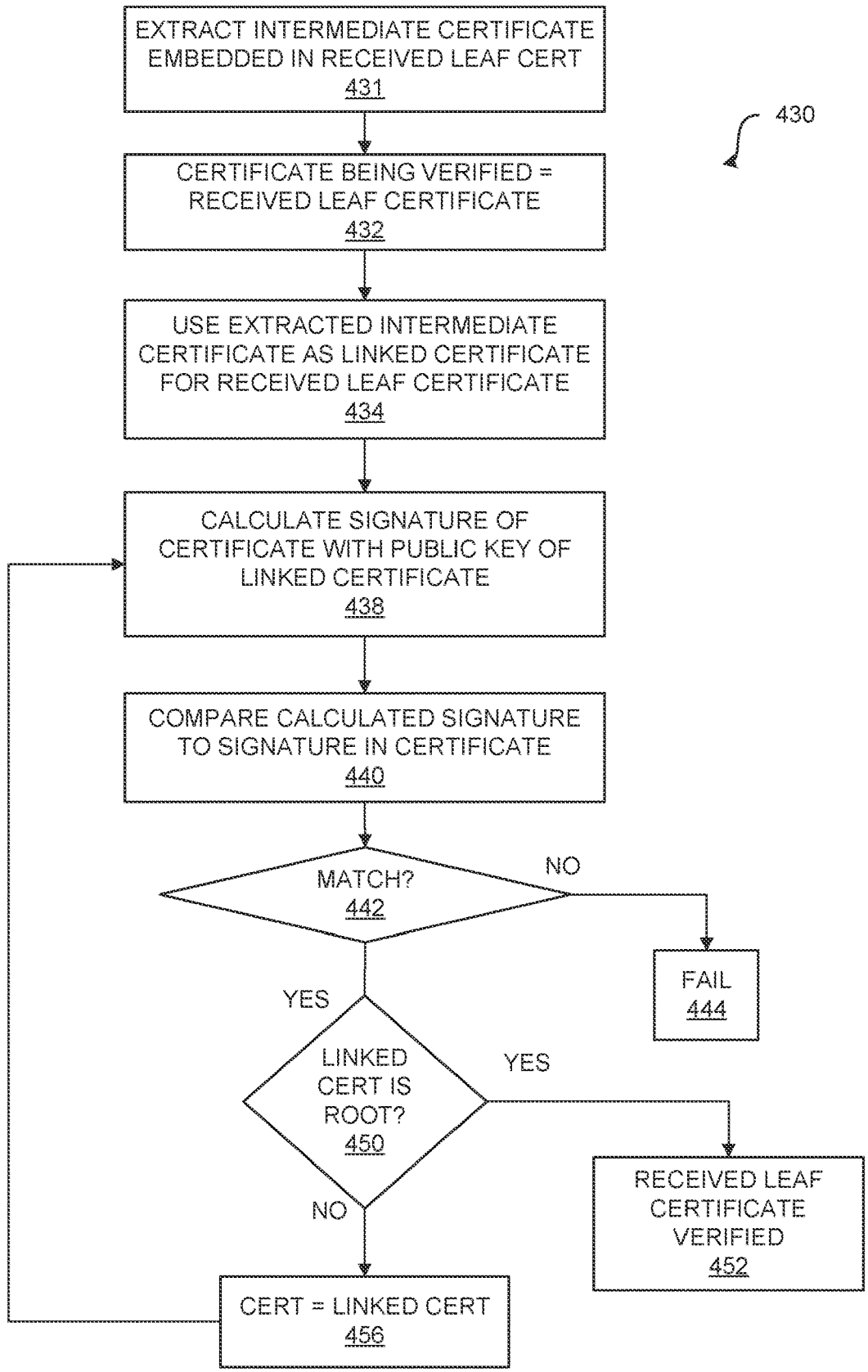
FIG. 4C is a control flow diagram showing a routine that illustrates aspects of further operations for verifying a certificate with an embedded intermediate certificate in accordance with aspects of the disclosed technology.

FIG. 4C is a control flow diagram showing a verification routine 430 that illustrates aspects of further operations for verifying a received leaf certificate with an intermediate certificate embedded in the leaf certificate in accordance with certain aspects of the disclosed technology.

At 431, an intermediate certificate embedded in a received leaf certificate is extracted. At 432, verification begins with the leaf certificate, e.g. the certificate being verified is the leaf certificate in a first pass of process 430. At 434, an intermediate certificate linked to the leaf certificate is obtained from the extracted intermediate certificate. In other words, the intermediate certificate embedded in the leaf certificate is the first linked certificate for the leaf certificate.

At 438, a signature is calculated for the certificate being verified, e.g. the received leaf certificate in a first pass of process 430, using a public key of the linked certificate from the extracted intermediate certificate, e.g. the public key from the extracted intermediate certificate is utilized to verify the signature of the leaf certificate on a first pass of process 430. In other words, for the first pass of process 430, the public key of the intermediate certificate extracted from the received leaf certificate is utilized to verify a signature of the received leaf certificate.

At 440, the calculated signature is compared to the signature in the certificate being verified, e.g. on a first pass of process 430, the signature calculated for the received leaf certificate utilizing the public key from the intermediate certificate embedded in the leaf certificate is compared to a signature in the received leaf certificate.

If the calculated signature matches the signature in the received leaf certificate, then control branches at 442 to 450. At 450, if the linked certificate is the root certificate, e.g. the root of the chain of trust, then the chain of trust is verified and control branches to 452. If the linked certificate is not the root certificate, then control branches at 450 to 456 to set the certificate being verified to the linked certificate and control returns to 434 to verify the next certificate in the chain of trust for the leaf certificate. In other words, verification of a received leaf certificate can include verification of each certificate in the chain of trust for the received leaf certificate.

If the calculated signature does not match the signature in the received leaf certificate, then verification fails and control branches at 442 to 444. If verification of a received leaf certificate fails utilizing an intermediate certificate embedded in the received leaf certificate, then it should be assumed that the chain of trust for the leaf certificate is compromised.

Note that verification of the received leaf certificate can, in some implementations, include verifying a hash value of the received leaf certificate. An example of these implementations can include, when creating and distributing the leaf certificate, calculating a first hash value for the leaf certificate before distributing the leaf certificate and including the first hash value in the leaf certificate to be distributed. The operation of signing the leaf certificate using an intermediate certificate could involve signing the leaf certificate with the first hash value using an intermediate certificate.

Verification of a received leaf certificate could involve calculating a second hash value for the received leaf certificate and comparing the second hash value to the first hash value included in the received leaf certificate. The operation for verifying the received leaf certificate could involve verifying the received leaf certificate when the calculated signature for the leaf certificate matches the signature included in the leaf certificate and the first hash value matches the second hash value.

It is to be appreciated that while the embodiments disclosed herein have been presented in the context of a service platform having a deployment or production environment for instantiation of an isolated environment and installation of a PM chain of trust, the technologies disclosed herein can be similarly applied to other contexts where similar functionality is utilized to establish an isolated environment and cryptographic systems for secure communication.

FIG. 5 is a computer architecture diagram that shows an architecture for a computer 500 capable of executing the software components described herein. The architecture illustrated in FIG. 5 is an architecture for a server computer, mobile phone, an e-reader, a smartphone, a desktop computer, a netbook computer, a tablet computer, a laptop computer, or another type of computing device suitable for executing the software components presented herein.

In this regard, it should be appreciated that the computer 500 shown in FIG. 5 can be utilized to implement a computing device capable of executing any of the software components presented herein. For example, and without limitation, the computing architecture described with reference to FIG. 5 can be utilized to implement the computing devices 104 or resource servers 120 illustrated in FIG. 1 or some or all of the components of the systems in FIG. 3 and described above, which are capable of executing the various software components described above.

The computer 500 illustrated in FIG. 5 includes a central processing unit 502 ("CPU"), a system memory 504, including a random-access memory 506 ("RAM") and a read-only memory ("ROM") 508, and a system bus 510 that couples the memory 504 to the CPU 502. A basic input/output system ("BIOS" or "firmware") containing the basic routines that help to transfer information between elements within the computer 500, such as during startup, is stored in the ROM 508. The computer 500 further includes one or more mass storage devices 512 for storing an operating system 521, application programs 522, and other types of programs including, but not limited to, the certificate management store 524 and certificate/chain of trust store 526.

The mass storage device 512 is connected to the CPU 502 through a mass storage controller (not shown) connected to the bus 510. The mass storage device 512 and its associated computer readable media provide non-volatile storage for the computer 500. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer executable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 500. For purposes of the claims, the phrase "computer storage medium," and variations thereof, does not include waves or signals per se or communication media.

According to various configurations, the computer 500 can operate in a networked environment using logical connections to remote computers through a network such as the network 518. The computer 500 can connect to the network 518 through a network interface unit 520 connected to the bus 510. It should be appreciated that the network interface unit 520 can also be utilized to connect to other types of networks and remote computer systems. The computer 500 can also include an input/output controller 516 for receiving and processing input from a number of other devices, including a keyboard, mouse, touch input, or electronic stylus (not shown in FIG. 5). Similarly, the input/output controller 516 can provide output to a display screen or other type of output device (also not shown in FIG. 5).

It should be appreciated that the software components described herein, such as the client device 204, resource server 220 or certificate authority 230, when loaded into the CPU 502 and executed, can transform the CPU 502 and the overall computer 500 from a general-purpose computing device into a special-purpose computing device customized to facilitate the functionality presented herein. The CPU 502 can be constructed from any number of transistors or other discrete circuit elements, which can individually or collectively assume any number of states. More specifically, the CPU 502 can operate as a finite-state machine, in response to executable instructions contained within the software modules disclosed herein. These computer executable instructions can transform the CPU 502 by specifying how the CPU 502 transitions between states, thereby transforming the transistors or other discrete hardware elements constituting the CPU 502.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 500 in order to store and execute the software components presented herein. It also should be appreciated that the architecture shown in FIG. 5 for the computer 500, or a similar architecture, can be utilized to implement other types of computing devices, including hand-held computers, video game devices, embedded computer systems, mobile devices such as smartphones and tablets, and other types of computing devices known to those skilled in the art. It is also contemplated that the computer 500 might not include all of the components shown in FIG. 5, can include other components that are not explicitly shown in FIG. 5, or can utilize an architecture completely different than that shown in FIG. 5.

Figure 6:
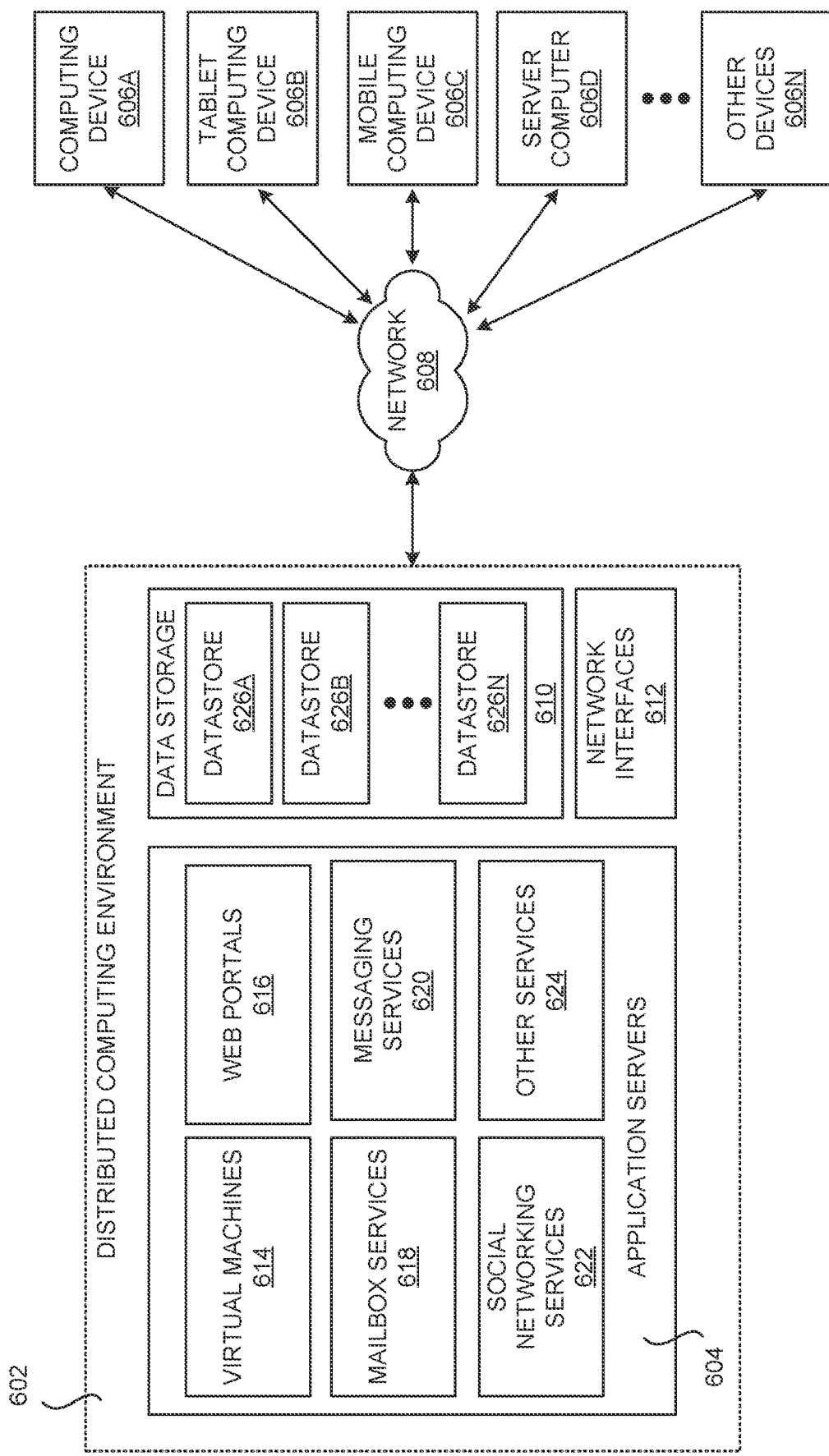
FIG. 6 is a network diagram illustrating a distributed computing environment capable of implementing aspects of the technologies presented herein.

FIG. 6 shows aspects of an illustrative distributed computing environment 602 that can provide cloud sourced resources, such as the resources provided by one or more compute resource provider systems, in which the software components described herein can be executed. Thus, the distributed computing environment 602 illustrated in FIG. 6 can be used to execute program code capable of providing the functionality described above with respect to FIGS. 1-5 and/or any of the other software components described herein.

According to various implementations, the distributed computing environment 602 operates on, in communication with, or as part of a network 608. One or more client devices 606A-706N (hereinafter referred to collectively and/or generically as "devices 606") can communicate with the distributed computing environment 602 via the network 608 and/or other connections (not illustrated in FIG. 6).

In the illustrated configuration, the devices 606 include: a computing device 606A such as a laptop computer, a desktop computer, or other computing device; a "slate" or tablet computing device ("tablet computing device") 606B; a mobile computing device 606C such as a mobile telephone, a smartphone, or other mobile computing device; a server computer 606D; and/or other devices 606N. It should be understood that any number of devices 606 can communicate with the distributed computing environment 602. Two example computing architectures for the devices 606 are illustrated and described herein with reference to FIGS. 6 and 7. It should be understood that the illustrated client devices 606 and computing architectures illustrated and described herein are illustrative and should not be construed as being limited in any way.

In the illustrated configuration, the distributed computing environment 602 includes application servers 604, data storage 610, and one or more network interfaces 612. According to various implementations, the functionality of the application servers 604 can be provided by one or more server computers that are executing as part of, or in communication with, the network 608. The application servers 604 can host various services such as virtual machines, portals, and/or other resources. In the illustrated configuration, the application servers 604 host one or more virtual machines 614 for hosting applications, such as program components for implementing the functionality described above with regard to FIGS. 3-5. It should be understood that this configuration is illustrative and should not be construed as being limiting in any way. The application servers 604 might also host or provide access to one or more web portals, link pages, websites, and/or other information ("web portals") 616.

According to various implementations, the application servers 604 also include one or more mailbox services 618 and one or more messaging services 620. The mailbox services 618 can include electronic mail ("email") services. The mailbox services 618 can also include various personal information management ("PIM") services including, but not limited to, calendar services, contact management services, collaboration services, and/or other services. The messaging services 620 can include, but are not limited to, instant messaging ("IM") services, chat services, forum services, and/or other communication services.

The application servers 604 can also include one or more social networking services 622. The social networking services 622 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 622 are provided by or include the FACEBOOK social networking service, the LINKEDIN professional networking service, the FOURSQUARE geographic networking service, and the like. In other configurations, the social networking services 622 are provided by other services, sites, and/or providers that might be referred to as "social networking providers." For example, some websites allow users to interact with one another via email, chat services, and/or other means during various activities and/or contexts such as reading published articles, commenting on goods or services, publishing, collaboration, gaming, and the like. Other services are possible and are contemplated.

The social network services 622 can include commenting, blogging, and/or microblogging services. Examples of such services include, but are not limited to, the YELP commenting service, the KUDZU review service, the OFFICETALK enterprise microblogging service, the TWITTER messaging service, and/or other services. It should be appreciated that the above lists of services are not exhaustive and that numerous additional and/or alternative social networking services 622 are not mentioned herein for the sake of brevity. As such, the configurations described above are illustrative, and should not be construed as being limited in any way.

As also shown in FIG. 6, the application servers 604 can also host other services, applications, portals, and/or other resources ("other services") 624. These services can include, but are not limited to, streaming video services like the NETFLIX streaming video service and productivity services such as the GMAIL email service from GOOGLE INC. It thus can be appreciated that activities performed by users of the distributed computing environment 602 can include various mailbox, messaging, social networking, group conversation, productivity, entertainment, and other types of activities. Use of these services, and others, can be detected and used to customize the operation of a computing device utilizing the technologies disclosed herein.

As mentioned above, the distributed computing environment 602 can include data storage 610. According to various implementations, the functionality of the data storage 610 is provided by one or more databases operating on, or in communication with, the network 608. The functionality of the data storage 610 can also be provided by one or more server computers configured to host data for the distributed computing environment 602. The data storage 610 can include, host, or provide one or more real or virtual datastores 626A-726N (hereinafter referred to collectively and/or generically as "datastores 626"). The datastores 626 are configured to host data used or created by the application servers 604 and/or other data.

The distributed computing environment 602 can communicate with, or be accessed by, the network interfaces 612. The network interfaces 612 can include various types of network hardware and software for supporting communications between two or more computing devices including, but not limited to, the devices 606 and the application servers 604. It should be appreciated that the network interfaces 612 can also be utilized to connect to other types of networks and/or computer systems.

It should be understood that the distributed computing environment 602 described herein can implement any aspects of the software elements described herein with any number of virtual computing resources and/or other distributed computing functionality that can be configured to execute any aspects of the software components disclosed herein. It should also be understood that the devices 606 can also include real or virtual machines including, but not limited to, server computers, web servers, personal computers, gaming consoles or other types of gaming devices, mobile computing devices, smartphones, and/or other devices. As such, various implementations of the technologies disclosed herein enable any device configured to access the distributed computing environment 602 to utilize the functionality described herein.

Figure 7:
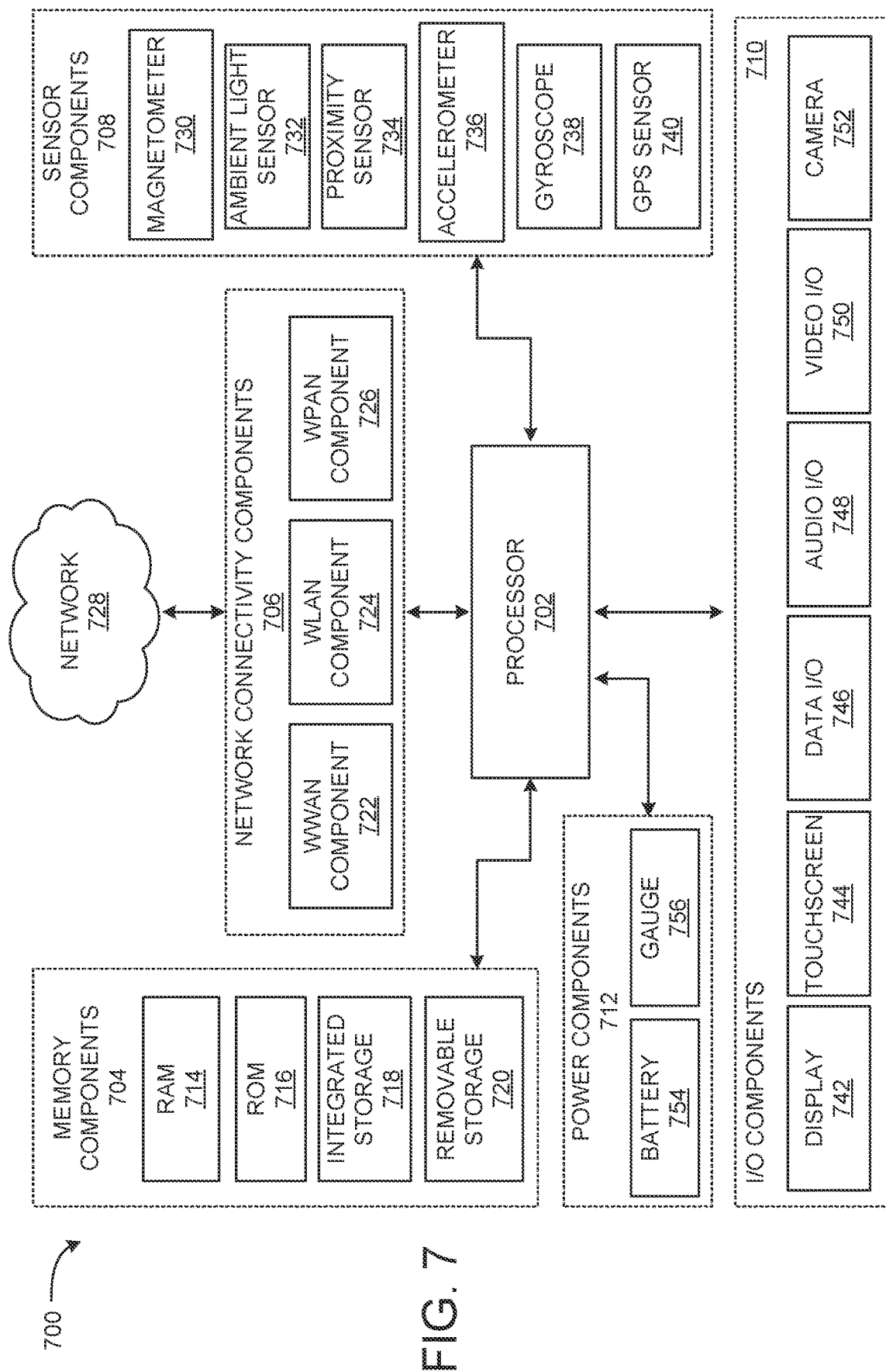
FIG. 7 is a computer architecture diagram illustrating a computing device architecture for a computing device, such as the computing devices shown in FIGS. 1A, 1B and 3, that is capable of implementing aspects of the technologies presented herein.

Turning now to FIG. 7, an illustrative computing device architecture 700 will be described for a computing device, such as the client devices 304, resource servers 320 or certificate authority 330 illustrated in FIG. 3, that is capable of executing the various software components described herein. The computing device architecture 700 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 700 is also applicable to any of the devices 606 shown in FIG. 6. Furthermore, aspects of the computing device architecture 700 are applicable to traditional desktop computers, portable computers (e.g., laptops, notebooks, ultra-portables, and netbooks), server computers, and other computer devices, such as those described herein. For example, the single touch and multi-touch aspects disclosed herein below can be applied to desktop, laptop, convertible, smartphone, or tablet computer devices that utilize a touchscreen or some other touch-enabled device, such as a touch-enabled track pad or touch-enabled mouse. The computing device architecture 700 can also be utilized to implement the client devices 204, resource servers 220 or certificate authority 230 illustrated in FIG. 2 and FIG. 3 and/or other types of computing devices for implementing or consuming the functionality described herein.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individual components illustrated in FIG. 7, the components can be connected electrically in order to interact and carry out device functions. In some configurations, the components are arranged so as to communicate via one or more busses (not shown).

The processor 702 includes one or more CPU cores configured to process data, execute computer executable instructions of one or more application programs and to communicate with other components of the computing device architecture 700 in order to perform various functionality described herein. The processor 702 can be utilized to execute aspects of the software components presented herein and, particularly, those that utilize, at least in part, a touch-enabled input.

In some configurations, the processor 702 includes a graphics processing unit ("GPU") configured to accelerate operations performed by the CPU, including, but not limited to, operations performed by executing general-purpose scientific and engineering computing applications, as well as graphics-intensive computing applications such as high-resolution video (e.g., 620P, 1080P, 4K, and greater), video games, 3D modeling applications, and the like. In some configurations, the processor 702 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 702 is, or is included in, a system-on-chip ("SoC") along with one or more of the other components described herein below. For example, the SoC can include the processor 702, a GPU, one or more of the network connectivity components 706, and one or more of the sensor components 708. In some configurations, the processor 702 is fabricated, in part, utilizing a package-on-package ("PoP") integrated circuit packaging technique. Moreover, the processor 702 can be a single core or multi-core processor.

The processor 702 can be created in accordance with an ARM architecture, available for license from ARM HOLDINGS of Cambridge, United Kingdom. Alternatively, the processor 702 can be created in accordance with an x86 architecture, such as is available from INTEL CORPORATION of Mountain View, Calif. and others. In some configurations, the processor 702 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 704 include a RAM 714, a ROM 716, an integrated storage memory ("integrated storage") 718, and a removable storage memory ("removable storage") 720. In some configurations, the RAM 714 or a portion thereof, the ROM 716 or a portion thereof, and/or some combination of the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 or the removable storage 720.

The integrated storage 718 can include a solid-state memory, a hard disk, or a combination of solid-state memory and a hard disk. The integrated storage 718 can be soldered or otherwise connected to a logic board upon which the processor 702 and other components described herein might also be connected. As such, the integrated storage 718 is integrated in the computing device. The integrated storage 718 can be configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available and shown to a user as a total combined capacity of the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system includes, but is not limited to, the WINDOWS operating system from MICROSOFT CORPORATION, the IOS operating system from APPLE INC. of Cupertino, Calif., and ANDROID operating system from GOOGLE INC. of Mountain View, Calif. Other operating systems can also be utilized.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from a network 728, which can be a WWAN, a WLAN, or a WPAN. Although a single network 728 is illustrated, the network connectivity components 706 can facilitate simultaneous communication with multiple networks. For example, the network connectivity components 706 can facilitate simultaneous communications with multiple networks via one or more of a WWAN, a WLAN, or a WPAN.

The network 728 can be a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 728 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 728 can be configured to provide voice and/or data communications with any combination of the above technologies. The network 728 can be configured or adapted to provide voice and/or data communications in accordance with future generation technologies.

In some configurations, the WWAN component 722 is configured to provide dual-multi-mode connectivity to the network 728. For example, the WWAN component 722 can be configured to provide connectivity to the network 728, wherein the network 728 provides service via GSM and UMTS technologies, or via some other combination of technologies. Alternatively, multiple WWAN components 722 can be utilized to perform such functionality, and/or provide additional functionality to support other non-compatible technologies (i.e., incapable of being supported by a single WWAN component). The WWAN component 722 can facilitate similar connectivity to multiple networks (e.g., a UMTS network and an LTE network).

The network 728 can be a WLAN operating in accordance with one or more Institute of Electrical and Electronic Engineers ("IEEE") 104.11 standards, such as IEEE 104.11a, 104.11b, 104.11 g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 728 via the WI-FI access points. Such connections can be secured via various encryption technologies including, but not limited, WI-FI Protected Access ("WPA"), WPA2, Wired Equivalent Privacy ("WEP"), and the like.

The network 728 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 730, an ambient light sensor 732, a proximity sensor 734, an accelerometer 736, a gyroscope 738, and a Global Positioning System sensor ("GPS sensor") 740. It is contemplated that other sensors, such as, but not limited to, temperature sensors or shock detection sensors, might also be incorporated in the computing device architecture 700.

The magnetometer 730 is configured to measure the strength and direction of a magnetic field. In some configurations, the magnetometer 730 provides measurements to a compass application program stored within one of the memory components 704 in order to provide a user with accurate directions in a frame of reference including the cardinal directions, north, south, east, and west. Similar measurements can be provided to a navigation application program that includes a compass component. Other uses of measurements obtained by the magnetometer 730 are contemplated.

The ambient light sensor 732 is configured to measure ambient light. In some configurations, the ambient light sensor 732 provides measurements to an application program stored within one the memory components 704 in order to automatically adjust the brightness of a display (described below) to compensate for low light and bright light environments. Other uses of measurements obtained by the ambient light sensor 732 are contemplated.

The proximity sensor 734 is configured to detect the presence of an object or thing in proximity to the computing device without direct contact. In some configurations, the proximity sensor 734 detects the presence of a user's body (e.g., the user's face) and provides this information to an application program stored within one of the memory components 704 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 734 are contemplated.

The accelerometer 736 is configured to measure proper acceleration. In some configurations, output from the accelerometer 736 is used by an application program as an input mechanism to control some functionality of the application program. In some configurations, output from the accelerometer 736 is provided to an application program for use in switching between landscape and portrait modes, calculating coordinate acceleration, or detecting a fall. Other uses of the accelerometer 736 are contemplated.

The gyroscope 738 is configured to measure and maintain orientation. In some configurations, output from the gyroscope 738 is used by an application program as an input mechanism to control some functionality of the application program. For example, the gyroscope 738 can be used for accurate recognition of movement within a 3D environment of a video game application or some other application. In some configurations, an application program utilizes output from the gyroscope 738 and the accelerometer 736 to enhance user input operations. Other uses of the gyroscope 738 are contemplated.

The GPS sensor 740 is configured to receive signals from GPS satellites for use in calculating a location. The location calculated by the GPS sensor 740 can be used by any application program that requires or benefits from location information. For example, the location calculated by the GPS sensor 740 can be used with a navigation application program to provide directions from the location to a destination or directions from the destination to the location. Moreover, the GPS sensor 740 can be used to provide location information to an external location-based service, such as E911 service. The GPS sensor 740 can obtain location information generated via WI-FI, WIMAX, and/or cellular triangulation techniques utilizing one or more of the network connectivity components 706 to aid the GPS sensor 740 in obtaining a location fix. The GPS sensor 740 can also be used in Assisted GPS ("A-GPS") systems.

The I/O components 710 include a display 742, a touchscreen 744, a data I/O interface component ("data I/O") 746, an audio I/O interface component ("audio I/O") 748, a video I/O interface component ("video I/O") 750, and a camera 752. In some configurations, the display 742 and the touchscreen 744 are combined. In some configurations two or more of the data I/O component 746, the audio I/O component 748, and the video I/O component 750 are combined. The I/O components 710 can include discrete processors configured to support the various interfaces described below or might include processing functionality built-in to the processor 702.

The display 742 is an output device configured to present information in a visual form. In particular, the display 742 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 742 is a liquid crystal display ("LCD") utilizing any active or passive matrix technology and any backlighting technology (if used). In some configurations, the display 742 is an organic light emitting diode ("OLED") display. Other display types are contemplated.

The touchscreen 744 is an input device configured to detect the presence and location of a touch. The touchscreen 744 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 744 is incorporated on top of the display 742 as a transparent layer to enable a user to use one or more touches to interact with objects or other information presented on the display 742. In other configurations, the touchscreen 744 is a touch pad incorporated on a surface of the computing device that does not include the display 742. For example, the computing device can have a touchscreen incorporated on top of the display 742 and a touch pad on a surface opposite the display 742.

In some configurations, the touchscreen 744 is a single-touch touchscreen. In other configurations, the touchscreen 744 is a multi-touch touchscreen. In some configurations, the touchscreen 744 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 744. As such, a developer can create gestures that are specific to a particular application program.

In some configurations, the touchscreen 744 supports a tap gesture in which a user taps the touchscreen 744 once on an item presented on the display 742. The tap gesture can be used for various reasons including, but not limited to, opening or launching whatever the user taps, such as a graphical icon. In some configurations, the touchscreen 744 supports a double tap gesture in which a user taps the touchscreen 744 twice on an item presented on the display 742. The double tap gesture can be used for various reasons including, but not limited to, zooming in or zooming out in stages. In some configurations, the touchscreen 744 supports a tap and hold gesture in which a user taps the touchscreen 744 and maintains contact for at least a pre-defined time. The tap and hold gesture can be used for various reasons including, but not limited to, opening a context-specific menu.

In some configurations, the touchscreen 744 supports a pan gesture in which a user places a finger on the touchscreen 744 and maintains contact with the touchscreen 744 while moving the finger on the touchscreen 744. The pan gesture can be used for various reasons including, but not limited to, moving through screens, images, or menus at a controlled rate. Multiple finger pan gestures are also contemplated. In some configurations, the touchscreen 744 supports a flick gesture in which a user swipes a finger in the direction the user wants the screen to move. The flick gesture can be used for various reasons including, but not limited to, scrolling horizontally or vertically through menus or pages. In some configurations, the touchscreen 744 supports a pinch and stretch gesture in which a user makes a pinching motion with two fingers (e.g., thumb and forefinger) on the touchscreen 744 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 744. As such, the above gestures should be understood as being illustrative and should not be construed as being limiting in any way.

The data I/O interface component 746 is configured to facilitate input of data to the computing device and output of data from the computing device. In some configurations, the data I/O interface component 746 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 748 is configured to provide audio input and/or output capabilities to the computing device. In some configurations, the audio I/O interface component 748 includes a microphone configured to collect audio signals. In some configurations, the audio I/O interface component 748 includes a headphone jack configured to provide connectivity for headphones or other external speakers. In some configurations, the audio interface component 748 includes a speaker for the output of audio signals. In some configurations, the audio I/O interface component 748 includes an optical audio cable out.

The video I/O interface component 750 is configured to provide video input and/or output capabilities to the computing device. In some configurations, the video I/O interface component 750 includes a video connector configured to receive video as input from another device (e.g., a video media player such as a DVD or BLU-RAY player) or send video as output to another device (e.g., a monitor, a television, or some other external display). In some configurations, the video I/O interface component 750 includes a High-Definition Multimedia Interface ("HDMI"), mini-HDMI, micro-HDMI, DisplayPort, or proprietary connector to input/output video content. In some configurations, the video I/O interface component 750 or portions thereof is combined with the audio I/O interface component 748 or portions thereof.

The camera 752 can be configured to capture still images and/or video. The camera 752 can utilize a charge coupled device ("CCD") or a complementary metal oxide semiconductor ("CMOS") image sensor to capture images. In some configurations, the camera 752 includes a flash to aid in taking pictures in low-light environments. Settings for the camera 752 can be implemented as hardware or software buttons.

Although not illustrated, one or more hardware buttons can also be included in the computing device architecture 700. The hardware buttons can be used for controlling some operational aspect of the computing device. The hardware buttons can be dedicated buttons or multi-use buttons. The hardware buttons can be mechanical or sensor-based.

The illustrated power components 712 include one or more batteries 754, which can be connected to a battery gauge 756. The batteries 754 can be rechargeable or disposable. Rechargeable battery types include, but are not limited to, lithium polymer, lithium ion, nickel cadmium, and nickel metal hydride. Each of the batteries 754 can be made of one or more cells.

The battery gauge 756 can be configured to measure battery parameters such as current, voltage, and temperature. In some configurations, the battery gauge 756 is configured to measure the effect of a battery's discharge rate, temperature, age and other factors to predict remaining life within a certain percentage of error. In some configurations, the battery gauge 756 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 712 can also include a power connector (not shown), which can be combined with one or more of the aforementioned I/O components 710. The power components 712 can interface with an external power system or charging equipment via a power I/O component 710. Other configurations can also be utilized.

Based on the foregoing, it should be appreciated that technology is disclosed that utilizes intermediate certificate embedded in a leaf certificate to verify the leaf certificate in a PM based secure communication protocol. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for verifying a leaf certificate in a PKI chain of trust, the method comprising:
receiving a leaf certificate signed by an intermediate certificate, the intermediate certificate being embedded in the leaf certificate, wherein embedding the intermediate certificate in the leaf certificate enables extracting the intermediate certificate from the leaf certificate and eliminates retrieving the intermediate certificate from intermediate certificate store;
based on the intermediate certificate being embedded in the leaf certificate, extracting the intermediate certificate from the leaf certificate;
calculating a signature for the leaf certificate using a public key from the extracted intermediate certificate;
comparing the calculated signature for the leaf certificate to a signature included in the leaf certificate; and
verifying the leaf certificate when the calculated signature for the leaf certificate matches the signature included in the leaf certificate, wherein verifying the leaf certificate based on the intermediate certificate embedded in the receive leaf certificate eliminates verification failures associated with unsynchronized intermediate certificates.

2. The computer-implemented method of claim 1, where step of verifying the leaf certificate when the calculated signature for the leaf certificate matches the signature included in the leaf certificate comprises:
when the calculated signature for the leaf certificate matches the signature included in the leaf certificate:
calculating a signature for each remaining certificate in a chain of trust for the leaf certificate;
comparing the calculated signature for each remaining certificate in the chain of trust for the leaf certificate to a signature included in each remaining certificate in the chain of trust; and
the step of verifying the leaf certificate when the calculated signature for the leaf certificate matches the signature included in the leaf certificate comprises verifying the leaf certificate when the calculated signature for the leaf certificate matches the signature included in the leaf certificate and when the calculated signature for each remaining certificate in the chain of trust for the leaf certificate matches the signature included in each remaining certificate in the chain of trust.

3. The method of claim 1, the method including:
receiving a certificate signing request for an identity;
generating the leaf certificate for the identity in response to the certificate signing request;
embedding an intermediate certificate in the leaf certificate;
signing the leaf certificate using the intermediate certificate; and
distributing the leaf certificate with the embedded intermediate certificate.

4. The method of claim 3, where the intermediate certificate is included in the leaf certificate as an X.509 property of the leaf certificate.

5. The method of claim 3, where the method includes:
calculating a first hash value for the leaf certificate before distributing the leaf certificate;
including the first hash value in the leaf certificate to be distributed;
the step of signing the leaf certificate using an intermediate certificate comprises signing the leaf certificate with the first hash value using an intermediate certificate;
calculating a second hash value for the leaf certificate;
comparing the second hash value to the first hash value included in the leaf certificate; and
verifying the leaf certificate when the calculated signature for the leaf certificate matches the signature included in the leaf certificate and the first hash value matches the second hash value.

6. The method of claim 1, wherein the intermediate certificate corresponds to an intermediate certificate authority.

7. The method of claim 1, where the leaf certificate is received and verified as part of a TLS handshake protocol.

8. One or more non-transitory computer storage media having computer executable instructions stored thereon which, when executed by one or more processors, cause the processors to execute a method for verifying a leaf certificate in a PKI chain of trust, the method comprising:
receiving a leaf certificate signed by an intermediate certificate, the intermediate certificate being embedded in the leaf certificate, wherein embedding the intermediate certificate in the leaf certificate enables extracting the intermediate certificate from the leaf certificate and eliminates retrieving the intermediate certificate from intermediate certificate store;
based on the intermediate certificate being embedded in the leaf certificate, extracting the intermediate certificate from the leaf certificate;
calculating a signature for the leaf certificate using a public key from the extracted intermediate certificate;
comparing the calculated signature for the leaf certificate to a signature included in the leaf certificate; and
verifying the leaf certificate when the calculated signature for the leaf certificate matches the signature included in the leaf certificate, wherein verifying the leaf certificate based on the intermediate certificate embedded in the receive leaf certificate eliminates verification failures associated with unsynchronized intermediate certificates.

9. The computer storage media of claim 8, where step of verifying the leaf certificate when the calculated signature for the leaf certificate matches the signature included in the leaf certificate comprises:
when the calculated signature for the leaf certificate matches the signature included in the leaf certificate:
calculating a signature for each remaining certificate in a chain of trust for the leaf certificate;
comparing the calculated signature for each remaining certificate in the chain of trust for the leaf certificate to a signature included in each remaining certificate in the chain of trust; and
the step of verifying the leaf certificate when the calculated signature for the leaf certificate matches the signature included in the leaf certificate comprises verifying the leaf certificate when the calculated signature for the leaf certificate matches the signature included in the leaf certificate and when the calculated signature for each remaining certificate in the chain of trust for the leaf certificate matches the signature included in each remaining certificate in the chain of trust.

10. The computer storage media of claim 8, where the method includes:
receiving a certificate signing request for an identity;
generating the leaf certificate for the identity in response to the certificate signing request;
embedding an intermediate certificate in the leaf certificate;
signing the leaf certificate using the intermediate certificate; and
distributing the leaf certificate with the embedded intermediate certificate.

11. The computer storage media of claim 10, where the intermediate certificate is included in the leaf certificate as an X.509 property of the leaf certificate.

12. The computer storage media of claim 10, where the method includes:
calculating a first hash value for the leaf certificate before distributing the leaf certificate;
including the first hash value in the leaf certificate to be distributed;
the step of signing the leaf certificate using an intermediate certificate comprises signing the leaf certificate with the first hash value using an intermediate certificate;
calculating a second hash value for the leaf certificate;
comparing the second hash value to the first hash value included in the leaf certificate; and
verifying the leaf certificate when the calculated signature for the leaf certificate matches the signature included in the leaf certificate and the first hash value matches the second hash value.

13. The computer storage media of claim 8, wherein the intermediate certificate corresponds to an intermediate certificate authority.

14. The computer storage media of claim 8, where the leaf certificate is received and verified as part of a TLS handshake protocol.

15. A computer system that verifies a leaf certificate in a PKI chain of trust, the system comprising:
one or more processors; and
at least one computer storage medium having computer executable instructions stored thereon which, when executed by the one or more processors, cause the one or more processors to perform a method for verifying a leaf certificate in a PM chain of trust, the method comprising:
receiving a leaf certificate signed by an intermediate certificate, the intermediate certificate being embedded in the leaf certificate, wherein embedding the intermediate certificate in the leaf certificate enables extracting the intermediate certificate from the leaf certificate and eliminates retrieving the intermediate certificate from intermediate certificate store;
based on the intermediate certificate being embedded in the leaf certificate, extracting the intermediate certificate from the leaf certificate;
calculating a signature for the leaf certificate using a public key from the extracted intermediate certificate;
comparing the calculated signature for the leaf certificate to a signature included in the leaf certificate; and
verifying the leaf certificate when the calculated signature for the leaf certificate matches the signature included in the leaf certificate, wherein verifying the leaf certificate based on the intermediate certificate embedded in the receive leaf certificate eliminates verification failures associated with unsynchronized intermediate certificates.

16. The computer system of claim 15, where step of verifying the leaf certificate when the calculated signature for the leaf certificate matches the signature included in the leaf certificate comprises:
when the calculated signature for the leaf certificate matches the signature included in the received leaf certificate:
calculating a signature for each remaining certificate in a chain of trust for the leaf certificate;
comparing the calculated signature for each remaining certificate in the chain of trust for the leaf certificate to a signature included in each remaining certificate in the chain of trust; and the step of verifying the leaf certificate when the calculated signature for the leaf certificate matches the signature included in the leaf certificate comprises verifying the leaf certificate when the calculated signature for the leaf certificate matches the signature included in the leaf certificate and when the calculated signature for each remaining certificate in the chain of trust for the leaf certificate matches the signature included in each remaining certificate in the chain of trust.

17. The computer system of claim 15, where the method includes:
   receiving a certificate signing request for an identity;
   generating the leaf certificate for the identity in response to the certificate signing request;
   embedding an intermediate certificate in the leaf certificate;
   signing the leaf certificate using the intermediate certificate; and
   distributing the leaf certificate with the embedded intermediate certificate.

18. The computer system of claim 17, where the intermediate certificate is included in the leaf certificate as an X.509 property of the leaf certificate.

19. The computer system of claim 17, where the method includes:
   calculating a first hash value for the leaf certificate before distributing the leaf certificate;
   including the first hash value in the leaf certificate to be distributed;
   the step of signing the leaf certificate using an intermediate certificate comprises signing the leaf certificate with the first hash value using an intermediate certificate;
   calculating a second hash value for the leaf certificate;
   comparing the second hash value to the first hash value included in the leaf certificate; and
   verifying the leaf certificate when the calculated signature for the leaf certificate matches the signature included in the leaf certificate and the first hash value matches the second hash value.

20. The computer system of claim 15, wherein the intermediate certificate corresponds to an intermediate certificate authority.

* * * * *